US008676652B1

(12) United States Patent  (10) Patent No.: US 8,676,652 B1
Boss et al.  (45) Date of Patent: Mar. 18, 2014

(54) SENDING A COUNTER-OFFER TO USE AN ALTERNATE PAYMENT OPTION

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/630,121

(22) Filed: Sep. 28, 2012

(51) Int. Cl.
  *G06Q 20/00* (2012.01)
  *G07B 17/00* (2006.01)
  *G07F 17/22* (2006.01)
  *G06Q 40/00* (2012.01)

(52) U.S. Cl.
  USPC ............. 705/16; 705/14.65; 705/30; 705/35; 705/39

(58) Field of Classification Search
  USPC ................................ 705/14.65, 16, 30, 35, 39
  See application file for complete search history.

(56) References Cited

U.S. PATENT DOCUMENTS

| 6,038,552 | A * | 3/2000 | Fleischl et al. ................. 705/44 |
| 7,171,370 | B2 * | 1/2007 | Burke ............................. 705/16 |
| 2005/0021363 | A1 * | 1/2005 | Stimson et al. .................. 705/1 |
| 2007/0106613 | A1 * | 5/2007 | Murphy .......................... 705/44 |
| 2008/0097805 | A1 | 4/2008 | Wells |
| 2008/0301049 | A1 * | 12/2008 | Dyson ............................. 705/42 |
| 2009/0240573 | A1 | 9/2009 | Spector |
| 2010/0088149 | A1 * | 4/2010 | Sullivan et al. ................. 705/10 |
| 2010/0299248 | A1 * | 11/2010 | Burke ............................. 705/39 |

OTHER PUBLICATIONS

Schreft, S. L., Transaction costs and the use of cash and credit. Mar. 14, 1990. Economic Theory 2, p. 283-296.*
"A New Frontier Removing Plastic From Payments-Securely and Conveniently"; Tabbedout—The New Frontier—What are you waiting for; printed: Aug. 3, 2012; Copyright 2011 ATX Innovation Inc.; <http://www.tabbedout.com/sections/2/about/the-new-frontier>.
Kenneth A Carow and Michael E Staten; "Debit, Credit, or Cash: Survey Evidence on Gasoline Purchases"; Journal of Economics and Business 1999; pp. 409-421; Copyright 1999 Elsevier Science, Inc., New York, NY.
"Are Consumers Cashing Out?"; Economic Commentary; Are Consumers Cashing Out? :: :: Economic Commentary :: Oct. 1, 2007 . . . ; printed: Aug. 3, 2012; <http://www.clevlandfed.org/research/Commentary/2007/100107.cfm>.
"The 2010 Federal Reserve Payment Study—Noncash Payment Trends in the United States: 2006-2009"; pp. 1-22; Updated Apr. 5, 2011; Copyright 2011, Federal Reserve System.

* cited by examiner

*Primary Examiner* — Scott Zare
(74) *Attorney, Agent, or Firm* — Nicholas L. Cadmus; Matthew Chung

(57) ABSTRACT

In a method for sending a counter-offer in response to receiving an indication about a point-of-sale transaction, a computer receives from a point-of-sale program a point-of-sale transaction and an indication that the point-of-sale transaction is to be paid for utilizing a first payment option and is to be recorded using a second payment option. The computer determines that a counter-offer is appropriate. The counter-offer includes a request that the point-of-sale transaction be paid for utilizing the second payment option. The computer sends to the point-of-sale program the counter-offer.

12 Claims, 3 Drawing Sheets

US 8,676,652 B1

SENDING A COUNTER-OFFER TO USE AN ALTERNATE PAYMENT OPTION

TECHNICAL FIELD

The present invention relates generally to the field of electronic transaction processing, and more specifically to a method, system, and computer program product for sending a counter-offer to a point-of-sale program to complete a point-of-sale transaction as a credit card account transaction in response to receiving a point-of-sale transaction that is not a credit card account transaction.

BACKGROUND

A point-of-sale (POS) is the location where a transaction occurs. The point-of-sale often refers to the physical electronic cash register or dedicated POS system used to complete a sale. A POS system may include software, hardware, and peripheral devices to manage the selling process.

A financial transaction is an agreement between a buyer and a seller (merchant) to exchange a good or service for payment. Many different payment options are available today, including cash, checks, gift cards, debit cards, and credit cards.

Credit cards are commonly employed in financial transactions. Typically, at least four parties are involved in a transaction involving a credit card account: the cardholder, the merchant, the acquirer (merchant's bank), and the issuer. The cardholder presents the card as payment to the merchant and the merchant submits the transaction to the acquirer (acquiring bank).

The acquirer verifies the credit card number, the transaction type and the amount with the issuer (card-issuing bank) and reserves that amount of the cardholder's credit limit for the merchant. Authorized transactions are stored in "batches", which are sent to the acquirer. Batches are typically submitted once per day at the end of the business day. If a transaction is not submitted in the batch, the authorization will stay valid for a period determined by the issuer, after which the held amount will be returned to the cardholder's available credit.

The acquirer sends the batch transactions through the credit card association, which debits the issuers for payment and credits the acquirer. Essentially, the issuer pays the acquirer for the transaction. Once the acquirer has been paid, the acquirer pays the merchant. The merchant receives the amount totaling the funds in the batch minus either the "discount rate," "mid-qualified rate", or "non-qualified rate" which are tiers of fees the merchant pays the acquirer for processing the transactions.

SUMMARY

A first aspect of the present invention discloses a method for sending a counter-offer in response to receiving an indication about a point-of-sale transaction. A computer receives from a point-of-sale program a point-of-sale transaction and an indication that the point-of-sale transaction is to be paid for utilizing a first payment option and is to be recorded using a second payment option. The computer determines that a counter-offer is appropriate. The counter-offer includes a request that the point-of-sale transaction be paid for utilizing the second payment option. The computer sends to the point-of-sale program the counter-offer.

A second aspect of the present invention discloses a program product for sending a counter-offer in response to receiving an indication about a point-of-sale transaction. The computer program product includes one or more computer-readable storage media and program instructions stored on the one or more computer-readable storage media. The program instructions include program instructions to receive from a point-of-sale program a point-of-sale transaction and an indication that the point-of-sale transaction is to be paid for utilizing a first payment option and is to be recorded using a second payment option. The program instructions include program instructions to determine that a counter-offer is appropriate. The counter-offer includes a request that the point-of-sale transaction be paid for utilizing the second payment option. The program instructions include program instructions to send to the point-of-sale program the counter-offer.

A third aspect of the present invention discloses system for sending a counter-offer in response to receiving an indication about a point-of-sale transaction. The computer system includes one or more computer processors, one or more computer-readable storage media, and program instructions stored on the computer-readable storage media for execution by at least one of the one or more processors. The program instructions include program instructions to receive from a point-of-sale program a point-of-sale transaction and an indication that the point-of-sale transaction is to be paid for utilizing a first payment option and is to be recorded using a second payment option. The program instructions include program instructions to determine that a counter-offer is appropriate. The counter-offer includes a request that the point-of-sale transaction be paid for utilizing the second payment option. The program instructions include program instructions to send to the point-of-sale program the counter-offer.

DETAILED DESCRIPTION

Figure 1:
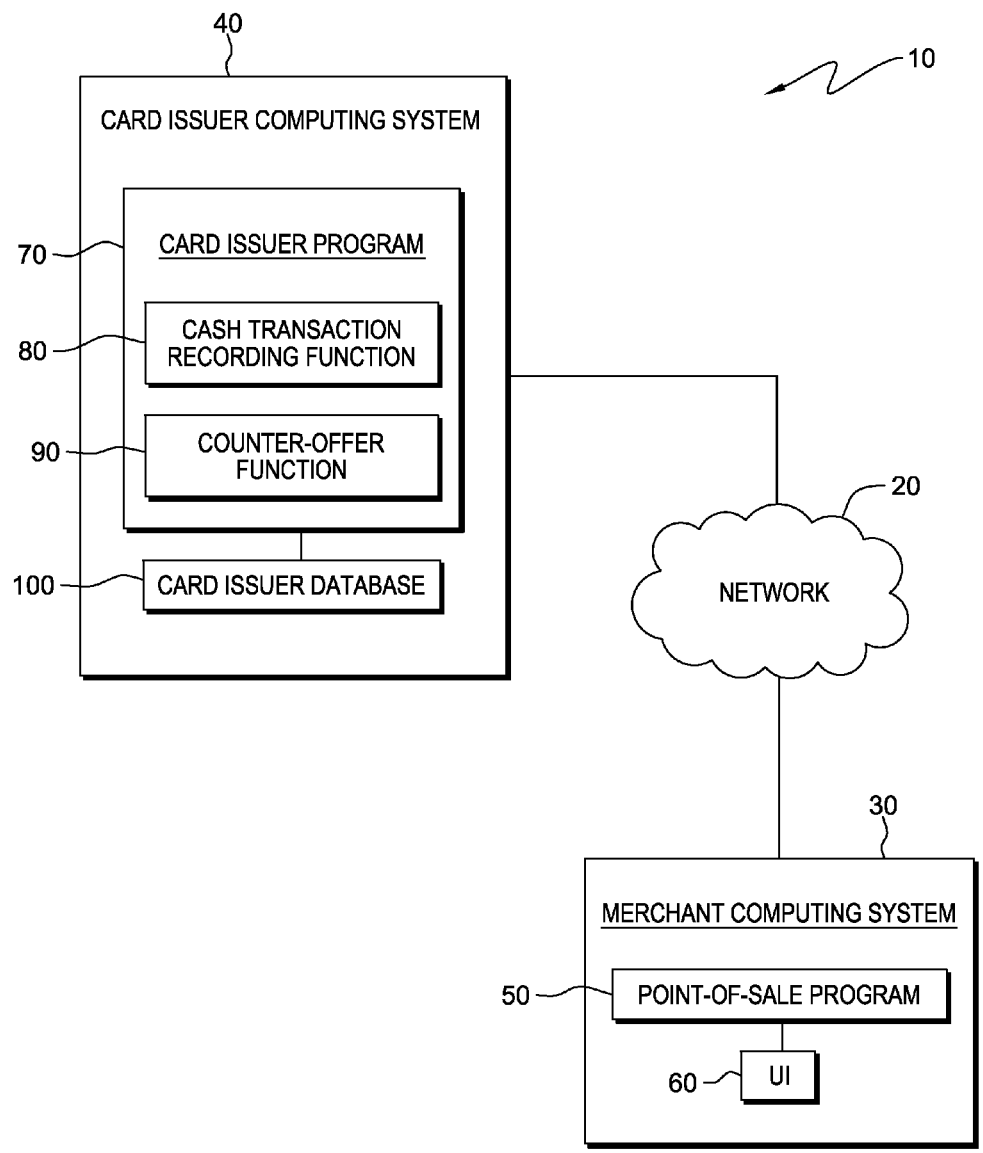
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer-readable program code/instructions embodied thereon.

Any combination of computer-readable storage media may be utilized. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes merchant computing system 30 and card issuer computing system 40 interconnected over network 20. Network 20 may be a local area network (LAN), a wide area network (WAN) such as the Internet, a cellular data network, the public switched telephone network (PSTN), any combination thereof, or any combination of connections and protocols that will support communications between merchant computing system 30 and card issuer computing system 40 in accordance with embodiments of the invention. Network 20 may include wired, wireless, or fiber optic connections. Computing system 10 may include additional computing devices, servers, computers, or other devices not shown.

Merchant computing system 30 may be a desktop computer, laptop computer, tablet computer, smart phone, or point-of-sale terminal. In general, merchant computing system 30 may be any electronic device or computing system capable of sending and receiving data, and communicating with card issuer computing system 40 over network 20. Merchant computing system 30 contains point-of-sale program 50 and user interface (UI) 60.

In another embodiment, merchant computing system 30 may also contain a peripheral device (not shown). The peripheral device may be a touch screen, Personal Identification Number (PIN) pad, card reader (e.g., magnetic card reader, smart card reader), or any combination thereof. In general, the peripheral device may be any electronic device capable of providing UI 60 for displaying the transaction details (e.g., the products, price of the products, etc.) to a customer and accepting input from a customer. Input from the customer may be a selection of payment method, credit/debit card account information, PIN's, or any other input for the transaction.

Card issuer computing system 40 may be a server computer such as a management server, a web server, or any other electronic device capable of receiving and sending data. In another embodiment, card issuer computing system 40 may represent a server computing system utilizing multiple computers as a server system, such as in a cloud computing environment. Card issuer computing system 40 contains card issuer program 70, cash transaction recording function 80, counter-offer function 90, and card issuer database 100.

Point-of-sale program 50 executes on merchant computing system 30. Point-of-sale program 50 may be a dedicated point-of-sale program, or any other program or function that can communicate with card issuer program 70 and provide UI 60 for completing a transaction. In other embodiments, point-of-sale program 50 may reside on another server or another computing system, provided that point-of-sale program 50 can communicate with card issuer program 70.

UI 60 operates on merchant computing system 30 to visualize content from point-of-sale program 50, such as the transaction details, (e.g., the products, price of the products, payment options, etc.) and allows for input to complete a transaction. UI 60 may include one or more interfaces such as, an operating system interface and application interfaces. In another embodiment, UI 60 may reside on another electronic device or computing system provided that UI 60 can communicate with point-of-sale program 50.

Card issuer program 70 operates to manage credit card account transactions received from point-of-sale program 50. In one embodiment, card issuer program 70 is a dedicated credit card account transaction program used by a credit card issuer (e.g., JPMorgan Chase & Co., Bank of America Corporation) to manage credit card account transactions made by cardholders. In one embodiment, card issuer program 70 stores all transaction information from the credit card account transactions that it manages in card issuer database 100. Along with the stored transaction information, card issuer program 70 may also store, in card issuer database 100, business statistical data (e.g., number of transactions, goals, etc.), and cardholder account data.

In one embodiment, card issuer program 70 resides on card issuer computing system 40. In other embodiments, card issuer program 70 may reside on another server or another computing device, provided that card issuer program 70 can communicate with point-of-sale program 50, has access to card issuer database 100, and is accessible to cash transaction recording function 80 and counter-offer function 90.

Card issuer database 100 may be a repository that may be written and read by card issuer program 70, cash transaction recording function 80, and counter-offer function 90. For example, card issuer database 100 may be a database such as an Oracle® database or an IBM® DB2® database.

Cash transaction recording function 80 operates to record a point-of-sale transaction that is not a credit card account transaction. In one embodiment, cash transaction recording function 80 receives a point-of-sale transaction from point-of-sale program 50. Cash transaction recording function 80 also receives an indication that the point-of-sale transaction is a non-credit card account transaction. Cash transaction recording function 80 receives the point-of-sale transaction and the indication that the point-of-sale transaction is a non-credit card account transaction from point-of-sale program 50 if counter-offer function 90 is not present or is inactive. Cash transaction recording function 80 tags the list of goods or services in the point-of-sale transaction as part of a non-credit card account transaction and records the point-of-sale transaction in card issuer database 100.

In another embodiment, cash transaction recording function 80 receives a point-of-sale transaction from point-of-sale program 50 that includes a list of goods or services tagged as part of a non-credit card account transaction. Cash transaction recording function 80 records the point-of-sale transaction in card issuer database 100.

In one embodiment, cash transaction recording function 80 is a function of card issuer program 70 on card issuer computing system 40. In other embodiments, cash transaction recording function 80 may be a separate program that resides on another server or another computing system, provided that cash transaction recording function 80 can communicate with point-of-sale program 50 and provided cash transaction recording function 80 has access to card issuer database 100.

In one embodiment, a non-credit card account transaction may be a cash transaction, a check transaction, a gift card transaction, debit card transaction, or any other type of financial transaction not involving a credit card account.

Counter-offer function 90 operates to send a counter-offer to point-of-sale program 50 to complete a point-of-sale transaction as a credit card account transaction in response to receiving the point-of-sale transaction that is not a credit card account transaction. In one embodiment, counter-offer function 90 receives a point-of-sale transaction from point-of-sale program 50 that is not a credit card account transaction. Counter-offer function 90 determines whether a counter-offer is appropriate. If a counter-offer is not appropriate, counter-offer function 90 records the point-of-sale transaction in card issuer database 100. If a counter-offer is appropriate, counter-offer function 90 sends the counter-offer to point-of-sale program 50.

A counter-offer is an offer from the card issuer to a cardholder to complete the point-of-sale transaction as a credit card account transaction. The counter-offer also includes one or more incentives to entice the cardholder to complete the point-of-sale transaction as a credit card account transaction.

In one embodiment, counter-offer function 90 is a function of card issuer program 70 on card issuer computing system 40. In other embodiments, counter-offer function 90 may be a separate program that resides on another server or another computing system, provided that counter-offer function 90 can communicate with point-of-sale program 50 and provided counter-offer function 90 has access to card issuer database 100.

Figure 3:
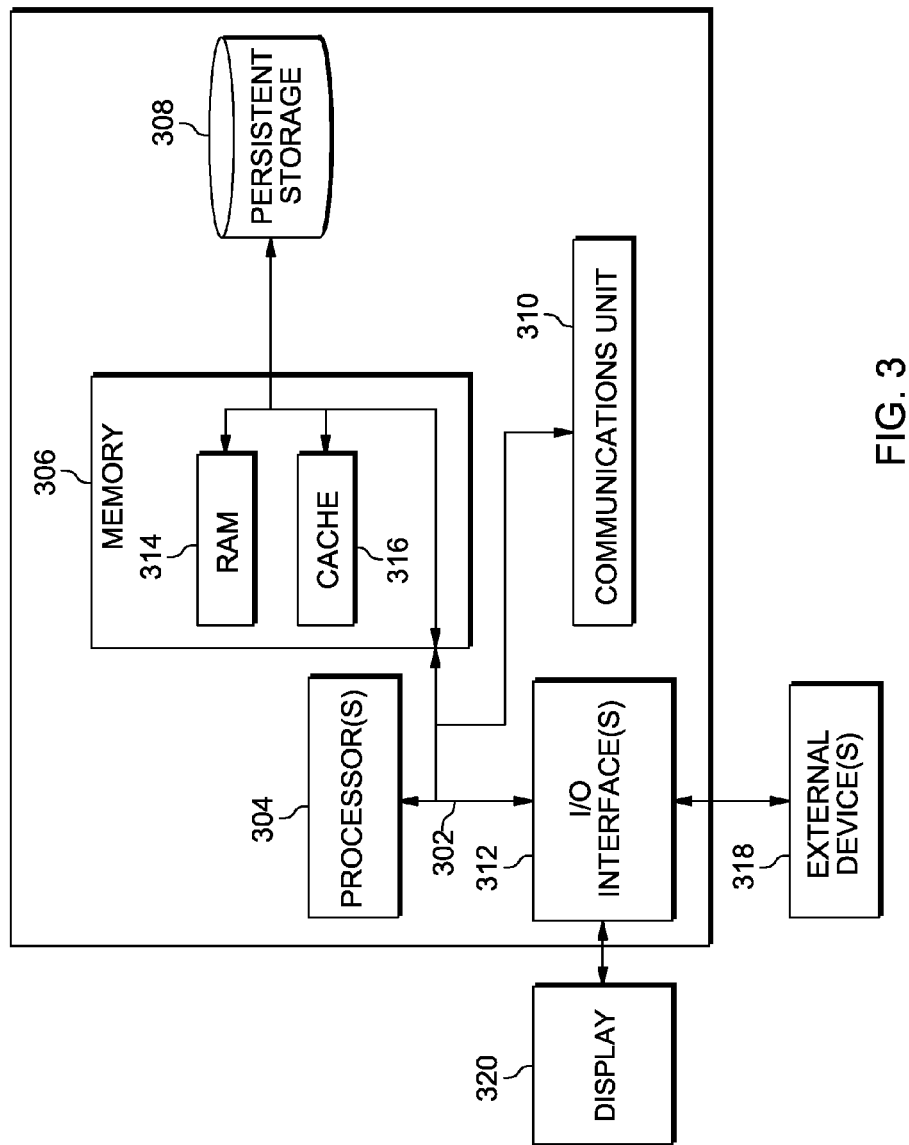
FIG. 3 depicts a block diagram of components of the merchant computing system and the card issuer computing system of FIG. 1 in accordance with one embodiment of the present invention.

Merchant computing system 30 and card issuer computing system 40 may each include components as depicted in further detail with respect to FIG. 3.

Figure 2:
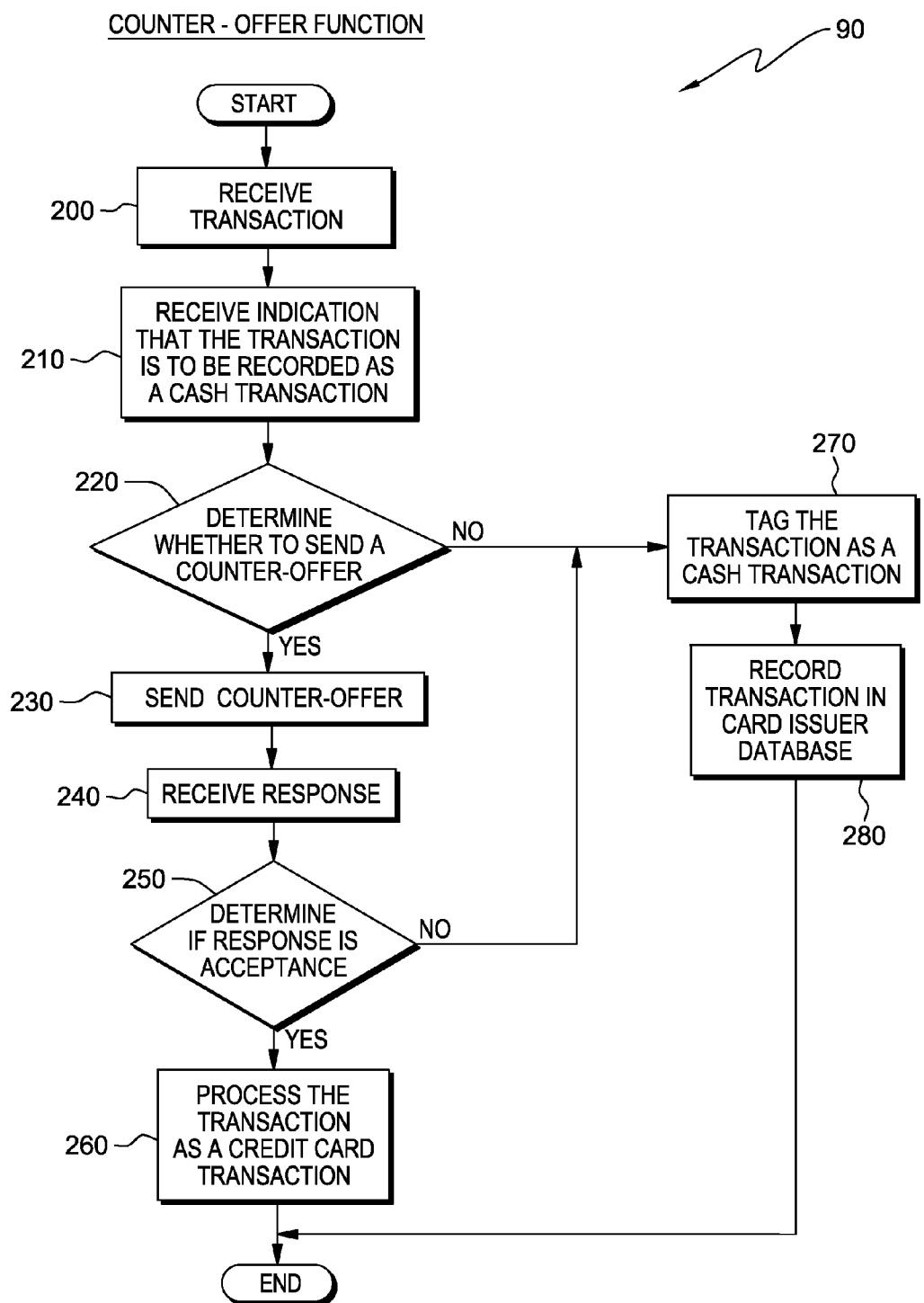
FIG. 2 depicts a flowchart of the steps of counter-offer function executing within the computing system of FIG. 1, for sending a counter-offer to a point-of-sale program to complete a point-of-sale transaction as a credit card account transaction in response to receiving point-of-sale transaction that is not a credit card account transaction, in accordance with one embodiment of the present invention.

FIG. 2 depicts a flowchart of the steps of counter-offer function 90 executing within the computing system of FIG. 1, for sending a counter-offer to point-of-sale program 50 to complete a point-of-sale transaction as a credit card account transaction in response to receiving a point-of-sale transaction that is not a credit card account transaction, in accordance with one embodiment of the present invention.

In one embodiment, initially, a cardholder decides to initiate a point-of-sale transaction with a merchant. A merchant or the cardholder will enter the good or service being purchased in to point-of-sale program 50. In one example, at a merchant's place of business a check-out clerk will generally enter the good or service (e.g., stock-keeping unit (SKU) used to identify each unique product or item for sale) in to UI 60. UI 60 sends the SKU to point-of-sale program 50. In another example, if the cardholder is at home they can enter a selection of the good or service in to UI 60 (e.g., a web browser connected to point-of-sale program 50) and UI 60 would send the selection of the good or service to point-of-sale program 50.

Point-of-sale program 50 sends details of the point-of-sale transaction to UI 60 to display to the cardholder. Details of the transaction may include, for example, an itemized list of goods or services, prices of the goods or services to be purchased in the transaction and total cost of the transaction.

Point-of-sale program 50 also sends to UI 60, UI elements (e.g., fields on a touch screen, links on a web browser, etc.) designating the different payment options available to complete the point-of-sale transaction. The different payment option may include, for example, a credit card account transaction, a cash transaction, a gift card transaction, a debit card transaction, or a check transaction. Included in those different payment options is the option to log the point-of-sale transaction to a cardholder's credit card account but pay for the point-of-sale transaction with another payment option.

The cardholder selects, on UI 60, the option to log the point-of-sale transaction to a cardholder's credit card account but pay for the point-of-sale transaction with another payment option. UI 60 sends the selection to point-of-sale program 50. Point-of-sale program 50 sends to UI 60 a request for the cardholder's credit card account number.

The cardholder inputs the cardholder's credit card account number in to UI 60. In one embodiment, the cardholder swipes their credit card in a credit card reader (a peripheral device of merchant computing system 30). In another embodiment, the cardholder may enter their credit card account number in to a web browser connected to point-ofsale program 50. In yet another embodiment, the cardholder may use a smart phone with near field communication (NFC) capabilities to communicate with and send the credit card account number to a peripheral device of merchant computing system 30 that also has NFC capabilities. NFC includes both communications based on radio frequency communication systems as well as optical communication systems.

In one embodiment, point-of-sale program 50 sends the point-of-sale transaction (e.g., a file including the details of the point-of-sale transaction) to counter-offer function 90 over network 20. Point-of-sale program 50 also sends an indication that the point-of-sale transaction is a non-credit card account transaction to be logged to the cardholder's credit card account. In one embodiment, the indication that the point-of-sale transaction is a non-credit card account transaction may be information in metadata sent with the point-of-sale transaction indicating that the point-of-sale transaction is a non-credit card account transaction. In another embodiment, point-of-sale program 50 may tag each good or service in the list of goods or services that they are part of a non-credit card account transaction.

In step 200, counter-offer function 90 receives a point-of-sale transaction from point-of-sale program 50. In another embodiment, counter-offer function 90 receives the point-of-sale transaction from card issuer program 70 if the point-of-sale transaction was sent to card issuer program 70 initially.

In step 210, counter-offer function 90 receives an indication that the point-of-sale transaction is not a credit card account transaction and it is to be logged to the cardholder's credit card account. In one embodiment, for example, the point-of-sale transaction is to be recorded as a cash transaction to the cardholder's account and paid for with cash at by the cardholder.

In decision 220, counter-offer function 90 determines whether to send a counter-offer to point-of-sale program 50. In one embodiment, counter-offer function 90 calls card issuer database 100 to fetch business statistical data of the card issuer. In one example, counter-offer function 90 determines if the number of total transactions made by all cardholders exceeds a goal number of transactions for a given time period. If not, sending a counter-offer is appropriate. In another example, counter-offer function 90 calls card issuer database to fetch the cardholder's account data. Counter-offer function 90 determines if the cardholder pays their bill on time each month. If so, sending a counter-offer is appropriate. In these examples, the counter-offer may include an incentive to use the credit card account for this point-of-sale transaction at a reduced or zero percent interest rate.

If counter-offer function 90 determines that sending a counter-offer to point-of-sale program 50 is appropriate (decision 220, yes branch), counter-offer function 90 sends the counter-offer to point-of-sale program 50 (step 230). In one embodiment, the counter-offer is received by point-of-sale program 50 and sent to UI 60 to be displayed to the cardholder. The counter-offer can be displayed as a UI element stating the counter-offer incentives and containing selection fields for the cardholder to accept or reject the counter-offer. The cardholder selects on UI 60 one of the selection fields to accept or reject the counter-offer. UI 60 sends the selection to point-of-sale program 50. Point-of-sale program 50 sends an indication of whether the cardholder accepted or rejected the counter-offer.

If counter-offer function 90 determines that sending a counter-offer to point-of-sale program 50 is not appropriate (decision 220, no branch), counter-offer function 90 tags the list of goods or services in the point-of-sale transaction as part of a non-credit card account transaction (step 270) and records the point-of-sale transaction in card issuer database 100 to the cardholder's credit card account (step 280). In another embodiment, if the list of goods or services in the point-of-sale transaction was already tagged as part of a non-credit card account transaction by point-of-sale program 50, counter-offer function 90 skips to step 280.

In step 240, counter-offer function 90 receives a response to the counter-offer from point-of-sale program 50. In one embodiment, the response is an indication of whether the cardholder accepted or rejected the counter-offer. In decision 250, counter-offer function 90 determines if the response is an acceptance of the counter-offer.

If counter-offer function 90 determines that the response is not an acceptance of the counter-offer (decision 250, no branch), counter-offer function 90 proceeds to step 270.

If counter-offer function 90 determines that the response is an acceptance of the counter-offer (decision 250, yes branch), counter-offer function 90 processes the point-of-sale transaction as a credit card account transaction (step 260). In one embodiment, counter-offer function forwards the point-of-sale transaction to card issuer program 70 for processing as a credit card account transaction.

FIG. 3 depicts a block diagram of components of merchant computing system 30 and card issuer computing system 40 in accordance with one embodiment of the present invention. It should be appreciated that FIG. 3 provides only an illustration of one implementation and does not imply any limitations with regard to the environments in which different embodiments may be implemented. Many modifications to the depicted environment may be made.

Merchant computing system 30 and card issuer computing system 40 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In one embodiment, memory 306 includes random access memory (RAM) 314 and cache memory 316. In general, memory 306 can include any suitable volatile or non-volatile computer-readable storage media.

Point-of-sale program 50 and UI 60 are stored for execution by one or more of the respective computer processors 304 of merchant computing system 30 via one or more memories of memory 306 of merchant computing system 30. Card issuer program 70, cash transaction recording function 80, counter-offer function 90, and card issuer database 100 are stored in persistent storage 308 of card issuer computing system 40 for execution and/or access by one or more of the respective computer processors 304 of card issuer computing system 40 via one or more memories of memory 306 of card issuer computing system 40. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Point-of-sale program 50 and UI 60 may be downloaded to persistent storage 308 of merchant computing system 30 through communications unit 310 of merchant computing system 30. Card issuer program 70, cash transaction recording function 80, counter-offer function 90, and card issuer database 100 may be downloaded to persistent storage 308 of card issuer computing system 40 through communication unit 310 of card issuer computing system 40.

I/O interface(s) 312 allows for input and output of data with other devices that may be connected to computing system 10. For example, I/O interface 312 may provide a connection to external devices 318 such as a keyboard, keypad, a touch screen, point-of-sale hardware (e.g., credit card reader), and/or some other suitable input device. External devices 318 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor or a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for sending a counter-offer in response to receiving an indication about a point-of-sale transaction, the method comprising the steps of:

a computer receiving an indication from a point-of-sale program that a point-of-sale transaction is to be logged to a cardholder's credit card account but paid for with another payment option;

the computer determining that a counter-offer is appropriate, wherein the counter-offer comprises a request that the point-of-sale transaction be paid for utilizing the cardholder's credit card account; and the computer sending to the point-of-sale program the counter-offer.

2. The method of claim 1, further comprising the steps of:

the computer receiving an indication that the counter-offer is accepted; and the computer processing the point-of-sale transaction utilizing the cardholder's credit card account.

3. The method of claim 1, further comprising the steps of:

the computer receiving an indication that the counter-offer is not accepted; and the computer logging the point-of-sale transaction to the cardholder's credit card account.

4. The method of claim 1, wherein the counter-offer further comprises an incentive to entice the cardholder to complete the point-of-sale transaction utilizing the cardholder's credit card account.

5. A computer program product for sending a counter-offer in response to receiving an indication about a point-of-sale transaction, the computer program product comprising:

one or more computer-readable hardware storage media and program instructions stored on the one or more computer-readable hardware storage media, the program instructions comprising:

program instructions to receive an indication from a point-of-sale program that a point-of-sale transaction is to be logged to a cardholder's credit card account but paid for with another payment option;

program instructions to determine that a counter-offer is appropriate, wherein the counter-offer comprises a request that the point-of-sale transaction be paid for utilizing the cardholder's credit card account; and program instructions to send to the point-of-sale program the counter-offer.

6. The computer program product of claim 5, further comprising:

program instructions, stored on the one or more computer-readable hardware storage media, to receive an indication that the counter-offer is accepted; and program instructions, stored on the one or more computer-readable hardware storage media, to process the point-of-sale transaction utilizing the cardholder's credit card account.

7. The computer program product of claim 5, further comprising:

program instructions, stored on the one or more computer-readable hardware storage media, to receive an indication that the counter-offer is not accepted; and program instructions, stored on the one or more computer-readable hardware storage media, to log the point-of-sale transaction to the cardholder's credit card account.

8. The computer program product of claim 5, wherein the counter-offer further comprises an incentive to entice the cardholder to complete the point-of-sale transaction utilizing the cardholder's credit card account.

9. A computer system for sending a counter-offer in response to receiving an indication about a point-of-sale transaction, the computer system comprising:

one or more computer processors;

one or more computer-readable storage media;

program instructions stored on the computer-readable storage media for execution by at least one of the one or more processors, the program instructions comprising:

program instructions to receive an indication from a point-of-sale program that a point-of-sale transaction is to be logged to a cardholder's credit card account but paid for with another payment option;

program instructions to determine that a counter-offer is appropriate, wherein the counter-offer comprises a request that the point-of-sale transaction be paid for utilizing the cardholder's credit card account; and program instructions to send to the point-of-sale program the counter-offer.

10. The computer system of claim 9, further comprising:

program instructions, stored on the one or more computer-readable storage media, to receive an indication that the counter-offer is accepted; and program instructions, stored on the one or more computer-readable storage media, to process the point-of-sale transaction utilizing the cardholder's credit card account.

11. The computer system of claim 9, further comprising:

program instructions, stored on the one or more computer-readable storage media, to receive an indication that the counter-offer is not accepted; and program instructions, stored on the one or more computer-readable storage media, to log the point-of-sale transaction utilizing the cardholder's credit card account.

12. The computer system of claim 9, wherein the counter-offer further comprises an incentive to entice the cardholder to complete the point-of-sale transaction utilizing the cardholder's credit card account.

\* \* \* \* \*